INVENTORS.
Barry A. Cooper
Willard H. Wharton
AGENT 3,412,606
ADHESION TESTING METHOD AND APPARATUS
Barry A. Cooper and Willard H. Wharton, Lake Jackson,
Tex., assignors to The Dow Chemical Company, Midland, Mich., a corporation of Delaware
Filed July 3, 1967, Ser. No. 650,924
11 Claims. (Cl. 73—150)

ABSTRACT OF THE DISCLOSURE

Adhesion between heat sealable materials is measured over a temperature range by placing samples to be evaluated on a temperature gradient bar. After the samples have reached the thermal equilibrium, one sample is stripped from the other and the force required to strip is plotted to determine the heat sealing range and relative degree of adhesion.

---

Figure 1:
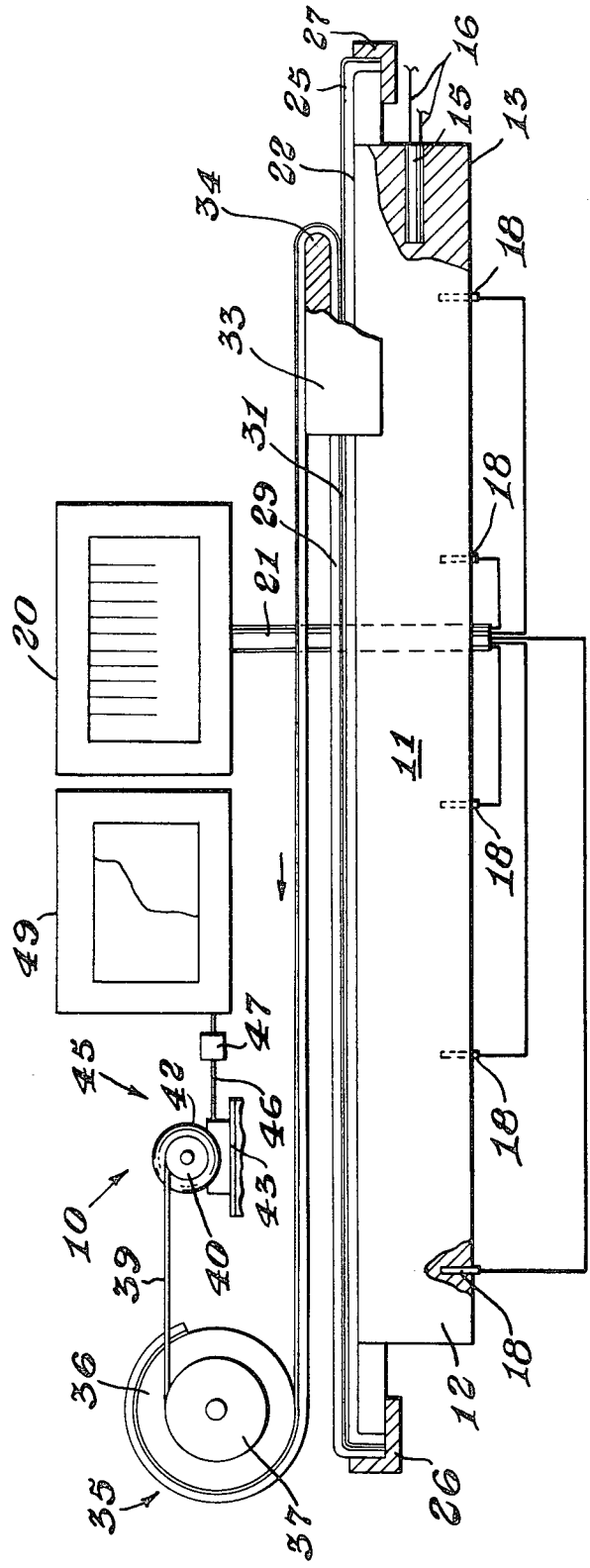

This invention relates to a method and apparatus for adhesion testing, and more particularly relates to a method and apparatus for determining adhesion characteristics over a range of temperatures employing a single sample.

Oftentimes, heat activatable adhesives are employed and it is desired to determine the general temperature range useful in heat sealing. Usually, this requires employing a plurality of samples and heat sealing the samples at a variety of temperatures and determining the strength of the seal.

It would be desirable if there were available a method and apparatus which would permit determination of heat sealing characteristics over a range of temperatures employing a single sample.

It would also be advantageous if there were available a method and apparatus which would permit relatively rapid determination of heat sealing characteristics.

It would also be advantageous if there were available an apparatus which would provide a permanent record of information relating to the heat sealing characteristics of the material over a range of temperatures.

These benefits and other advantages in accordance with the method of the present invention are achieved by providing first and second sheets of a material in generally face-to-face adjacent relationship, the sheets having disposed between major faces thereof a material to be evaluated for heat sealing characteristics, the sheets having a first end and a second end, heating the sheets in such a manner that a temperature gradient exists between the first and second ends, the temperature gradient being sufficient to cause at least a portion of the first and second sheets to be adhered together by means of the heat sealing material, subsequently separating the sheets while obtaining an indication of the force required for the separation of the sheets.

Also contemplated within the scope of the present invention is an adhesion testing apparatus comprising, in cooperative combination, a temperature gradient body, the body defining a sample contact surface, means to heat the body to provide a temperature gradient along the sample contact surface, means to restrain the sample on the sample contact surface, sample stripping means, and means to indicate relative force required to strip a sample.

Further features and advantages of the present invention will become more apparent from the following specification taken in connection with the drawing wherein:

FIGURE 1 schematically depicts an apparatus in accordance with the present invention.

Figure 2:
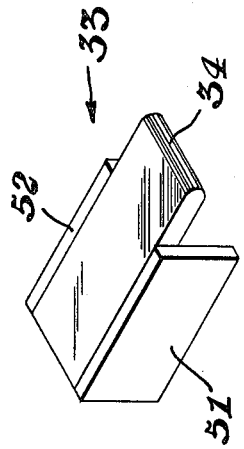

FIGURE 2 is a schematic representation of a bridge or sled employed in the apparatus of FIGURE 1.

In FIGURE 1 there is illustrated adhesion testing apparatus generally designated by the reference numeral 10. The testing apparatus 10 comprises in cooperative combination a temperature gradient body or bar 11. The bar 11 defines a first or cold end 12 and a second or hot end 13. A heat source 15 such as an electrical cartridge heater is disposed in the second or hot end 13 of the gradient body 11. A heater 15 is in operative communication with a power source not shown by means of power supply means or conductors 16. The body 11 has disposed therein a plurality of temperature sensing elements or thermocouples 18. The thermocouples 18 are in operative communication with a temperature recording apparatus 20 by means of a cable 21. The body 11 defines a sample engaging or work surface 22. The work surface 22 is upwardly disposed. A first sheet 25 is disposed on the surface 22 and restrained thereon by means of first and second sample restraining means 26 and 27 which beneficially may be an adhesive tape, mechanical clamp or other fastening means. A second sheet 29 is disposed upon the surface of the first sheet 25 remote from the working surface 22 of the body 11. A heat activatable adhesive 31 is disposed between the sheets 29 and 25. A sled or stripping guide 33 is disposed on a surface of the sheet 29 most remote from the surface 22. The stripping guide 33 has a sheet engaging edge 34 of generally constant radius about which the second sheet 29 is bent. A stripping means 35 is positioned adjacent the first end 12 of the body 11 and engages a portion of the sheet 29. The stripping means 35 comprises a first drum 36 and a second drum 37. The drums 36 and 37 are coaxially mounted. The drum 36 is adapted to wind upon its outer surface a portion of the second sheet 29 or a flexible element affixed thereto. The second drum 37 has on its external surface a flexible driving element 39 such as a cable or flexible tape. The driving element 39 engages a third drum 40 which is rotated by a power source 42 such as a gear head synchronous motor. The motor 42 is deflectively supported by a support means 43. The motor 42 is in operative engagement with a force measuring means 45. The force measuring means 45 comprises a connecting means 46, a transducer 47 and a force indicating means or recorder 49.

In FIGURE 2 there is shown an isometric representation of the sled 33 of FIGURE 1. The sled 33 has a generally channel-like configuration having flanges 51 and 52 adapted to engage slidably the body 11 and maintain the curved edge 34 generally normal to the longitudinal axis of the body 11.

In operation of the apparatus 10, a first strip such as the strip 25 is disposed upon the surface 22 of the body 11 and secured at either end by a suitable clamping or securing means. A second strip such as the strip 29 is positioned on top of the strip 25. The strips are maintained in generally face-to-face engagement until thermal equilibrium has been achieved. One end of the strip 29 is affixed to the stripping means and the sled or stripping guide 33 is positioned. By rotation of the drum 36 in the appropriate direction, the strip 29 is peeled from the strip 25 and the force recorded (beneficially as a continuous function of the temperature of the body 11 adjacent the region being stripped). Optionally, incremental measurement of the force is satisfactory in many cases and permits drawing a suitable curve of force versus temperature. It is usually advantageous that the material being evaluated be supported on a generally temperature-insensitive substrate, that is, a substrate which is not significantly affected by the heat applied from the temperature gradient bar 11. For evaluation of hot melt adhesives, oftentimes paper is an eminently satisfactory substrate and hot melt adhesives are readily evaluated by coating a strip of paper with a predetermined thickness of the material to be evaluated employing one portion of the coated strip as the strip 25 and the remaining portion as the strip 29, the coated surfaces being placed in mating engagement. The strips are then heated for the required period of time and the strip corresponding to the strip 29 peeled from the strip corresponding to the strip 25. In the case of a synthetic resinous hot melt adhesive such as a polyethylene, the temperature gradient body at the second end 13 has a temperature sufficiently high to cause melting of the polyethylene and at the first end 12 a temperature below heat sealing temperature. As the temperature along the length of the bar is readily determined by means of suitable heat sensing devices such as thermocouples or thermometers, the temperature at any particular point in the bar is readily calculated from a curve obtained by plotting temperature versus distance from a fixed point at one end of the bar. As the strip is peeled, initially a relatively low resistance or small force is required as the adhesive such as polyethylene is in a molten condition. The force then increases as the adhesive becomes more viscous at lower temperatures and the force required to peel the strips apart remains relatively high over the region in which a satisfactory heat seal may be obtained and drops to a very low value toward the first or cold end of the temperature gradient body where no sealing has occurred. The force required to separate the strips is readily obtained by calibration of the equipment by employing strips below the heat sealing range, subsequently raising the temperature so that some portion of the test strips heat seal together measuring the force and deducting the smaller of the two quantities from the larger. Generally, the configuration of the apparatus depicted in FIGURE 1, wherein the upper strip 29 is peeled from the lower strip by bending to an angle or forming a bend of about 180°, is eminently satisfactory in that it is usually more convenient for operation to have the stripping means 35 generally in or close to the same plane as the temperature gradient bar 11. However, peeling at an angle of about 90° is also satisfactory if available space permits.

The apparatus and method of the present invention are eminently satisfactory for evaluating a wide variety of heat activatable adhesives both of a thermoplastic and thermosetting variety. It is critical to the practice of the present invention that when support strips are employed such as paper, that the material being evaluated be adhered to the support strips otherwise little or no evaluation of the heat sealing characteristics of the material being evaluated are obtained.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the evaluation of a heat activatable adhesive, the steps of the method comprising:
   providing first and second sheets of a material in generally face-to-face adjacent relationship, the sheets having disposed between major faces thereof a material to be evaluated for heat sealing characteristics, the sheets having
   a first end, and
   a second end,
   heating the sheets in such a manner that a temperature gradient exists between the first and second ends, the temperature gradient being sufficient to cause at least a portion of the first and second sheets to be adhered together by means of the heat sealing material,
   subsequently separating the sheets while obtaining an indication of the force required for the separation of the sheets.

2. The method of claim 1 wherein the sheets have a generally strip-like configuration.

3. The method of claim 1 wherein the sheets are separated by peeling apart and introducing a bend into one sheet of at least 90°.

4. The method of claim 3 wherein the sheet being peeled is restrained adjacent the region of peeling by means disposed at about 90° to the direction of peeling.

5. The method of claim 1 wherein the heat sealing resin is a thermoplastic resin.

6. An adhesion testing apparatus comprising, in cooperative combination:
   a temperature gradient body, the body defining
   a sample contact surface,
   means to heat the body to provide a temperature gradient along the sample contact surface,
   means to restrain the sample on the sample contact surface,
   sample stripping means, and
   means to indicate relative force required to strip a sample.

7. The apparatus of claim 6 wherein the temperature gradient body has an elongate configuration having a first end and a second end and the sampler contact surface extends from the first end to the second end, a heating means disposed within the second end of the body.

8. The apparatus of claim 7 wherein the stripping means is disposed adjacent the first end of the body.

9. The apparatus of claim 7 including a sled slidably disposed over the sample contact surface having a curved sample engaging edge directed toward the second end of the body, the sled being slidable from the first end to the second end.

10. The apparatus of claim 6 including means to record the force required to strip a sample.

11. The apparatus of claim 6 wherein the sample stripping means comprises a rotatable drum.

References Cited

UNITED STATES PATENTS

| | | | |
|---|---|---|---|
| 2,336,238 | 12/1943 | Fordyce et al. | 73—150 XR |
| 2,473,517 | 6/1949 | Freedman | 73—150 |
| 2,604,783 | 7/1952 | Herrlinger | 73—150 |
| 2,834,205 | 5/1958 | Pickup | 73—150 |
| 3,019,644 | 2/1962 | Mancini | 73—150 |
| 3,372,583 | 3/1968 | Van Beek | 73—150 |

S. CLEMENT SWISHER, *Acting Primary Examiner.*

J. NOLTON, *Assistant Examiner.*